US008588704B2

(12) United States Patent
Gregg et al.

(10) Patent No.: US 8,588,704 B2
(45) Date of Patent: Nov. 19, 2013

(54) SIMULTANEOUS DOWNLINK SENSITIVITY TESTING FOR MULTIPLE MODULATION SCHEMES IN A WIRELESS TEST SYSTEM

(75) Inventors: Justin Gregg, San Francisco, CA (US); Adil Syed, Santa Clara, CA (US); Tomoki Takeya, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 222 days.

(21) Appl. No.: 13/044,844

(22) Filed: Mar. 10, 2011

(65) Prior Publication Data

US 2012/0231744 A1    Sep. 13, 2012

(51) Int. Cl.
*H04B 17/00* (2006.01)

(52) U.S. Cl.
USPC .................. 455/67.12; 455/67.11; 455/150.1

(58) Field of Classification Search
USPC ....................... 455/67.11, 67.12, 150.1, 226.1
See application file for complete search history.

(56) References Cited

U.S. PATENT DOCUMENTS

| | | | |
|---|---|---|---|
| 6,144,692 A * | 11/2000 | Beck | 375/130 |
| 7,206,549 B2 | 4/2007 | Lin et al. | |
| 7,880,670 B2 * | 2/2011 | Villarroel et al. | 342/165 |
| 2005/0176376 A1 | 8/2005 | Liu | |
| 2007/0275667 A1 | 11/2007 | Leung et al. | |
| 2010/0077270 A1 | 3/2010 | Rupp et al. | |
| 2012/0207030 A1 * | 8/2012 | Luong | 370/245 |

OTHER PUBLICATIONS

Gregg et al., U.S. Appl. No. 13/044,857, filed Mar. 10, 2011.

* cited by examiner

*Primary Examiner* — Tuan H Nguyen
(74) *Attorney, Agent, or Firm* — Treyz Law Group; Jason Tsai (57) ABSTRACT

A test station may include a test host, a tester, and a test chamber. Multiple devices under test (DUTs) may be placed in the test chamber during device characterization operations. Radio-frequency signals may be conveyed from the tester to the multiple DUTs using a radiated arrangement through an antenna in the test chamber. The tester may broadcast downlink test signals in parallel to the multiple DUTs. The DUTs may simultaneously synchronize with the downlink test signals and measure radio-frequency performance levels while receiving the downlink test signals. The test host may direct the tester to gradually lower its output power level. The DUTs may be used to determine downlink sensitivity by monitoring the measured radio-frequency performance levels as the output power level of the tester is lowered. Simultaneously downlink sensitivity testing may be performed for multiple modulation schemes and data rates for any communications protocol.

22 Claims, 7 Drawing Sheets

| TX POWER (dBm) | PACKET ERROR RATE (%) | | |
|---|---|---|---|
| | MOD1 | MOD2 | ... |
| $P_{hi}$ { -50 | 1 | 0.9 | |
| -55 | 2 | 1.6 | |
| ⋮ | | | |
| -91 | 6.9 | 6.0 | |
| -92 | 7.5 | 6.5 | |
| -93 | 8  ←410 | 7.4 | |
| -94 | 8.5 | 8  ←412 | |
| -95 | 9.2 | 8.7 | |
| ⋮ | | | |
| $P_{lo}$ | | | |

SIMULTANEOUS DOWNLINK SENSITIVITY TESTING FOR MULTIPLE MODULATION SCHEMES IN A WIRELESS TEST SYSTEM

BACKGROUND

This relates generally to testing wireless electronic devices and, more particularly, to testing multiple wireless electronic devices placed in a test chamber.

Wireless electronic devices typically include transceiver circuitry, antenna circuitry, and other radio-frequency circuitry that provide wireless communications capabilities. During testing, wireless electronic devices under test (DUTs) can exhibit different performance levels. For example, each wireless DUT in a group of DUTs can exhibit its own output power level, gain, frequency response, efficiency, linearity, dynamic range, downlink sensitivity, etc.

The performance of a wireless DUT can be measured using a radio-frequency (RF) test station. A radio-frequency test station typically includes a test host, a tester (i.e., a signal generator), and a test chamber. The signal generator is connected to the test host. Connected in this way, the test host configures the signal generator to transmit downlink radio-frequency signals during test operations.

In conventional radio-frequency test arrangements, a single wireless DUT having, for example, a wireless local area network (WLAN) transceiver is placed into the test chamber. The DUT is connected to the test host using a radio-frequency cable or coupled through a wireless waveguide or antenna system. A protocol-compliant data link connection is established between the signal generator and the DUT (i.e., radio-frequency signals are conveyed between the signal generator and the WLAN transceiver over an authenticated data link).

The test host can, as an example, be used to direct the signal generator to wirelessly transmit eight different types of test packets, each of which is encoded using a respective modulation scheme. Each time the DUT successfully receives a test packet, the DUT responds by sending an acknowledgement signal back to the signal generator.

A power detector unit coupled to the signal generator may be used to keep track of the number of acknowledgment signals that the signal generator receives from the DUT. The power detector unit may rely on externally supplied information to separately calculate the packet error rate for each of the eight different modulation schemes under test.

Downlink sensitivity is performed by lowering the output power level at which the test packets are being transmitted and monitoring the corresponding packet error rates using the power detector unit. Downlink sensitivity testing performed using the power detector unit may be costly.

Once the downlink sensitivity value has been determined for each of the modulation schemes, the DUT is disconnected from the test host (i.e., by unplugging the radio-frequency cable from the DUT) and is removed from the test chamber. To test a new DUT, the new DUT is connected to the test host (i.e., by plugging the radio-frequency cable into a corresponding mating connector in the new DUT) and is placed into the test chamber.

Wireless testing using this conventional approach may be inefficient, because the process of connecting a DUT to the test host, placing the DUT in the test chamber, testing the DUT, removing the DUT from the test chamber, and disconnecting the DUT from the test host one DUT at a time is time-consuming. Moreover, protocol-based testing allows testing of only a single DUT and requires more tedious measurement processes. Protocol-compliant testing also has a tendency to drop connections between the DUT and tester when the output power falls below the DUT's downlink sensitivity. Re-establishing the protocol compliant connection in order to complete testing can add significant time and cost to the test process.

It would therefore be desirable to be able to provide improved ways of performing sensitivity testing across multiple modulation schemes.

SUMMARY

Test stations in a radio-frequency test system can be used to perform wireless testing on wireless devices under test (DUTs). Each test station may include a test host, a tester (e.g., a signal generator), and a test chamber. During wireless testing, more than one DUT may be placed within the test chamber.

Radio-frequency signals may be conveyed between the tester and the multiple DUTs through a test antenna that is placed within the test chamber. The antenna may transmit and receive radio-frequency signals to and from the multiple DUTs in the test chamber. Testing the DUTs using this radiated test setup takes into account the effect of over-the-air transmission.

Downlink sensitivity testing may be performed on the multiple DUTs in parallel. Each DUT may include cellular telephone transceiver circuitry, wireless local area network (WLAN) circuitry, and other wireless communications circuitry. The downlink sensitivity for the WLAN transceiver circuitry of each DUT may be tested in parallel (as an example). Downlink sensitivity may be defined as the minimum output power level of radio-frequency signals transmitted from another wireless device for which the received radio-frequency signals exhibit a performance level (e.g., symbol error rate, bit error rate, frame error rate, packet error rate, data rate, dynamic range, error vector magnitude, frequency response, etc.) satisfying design criteria.

During downlink sensitivity testing, the test host may direct the tester to broadcast radio-frequency signals over a communications path which is not necessarily based on standard protocol (e.g., wireless communication between the tester and the DUTs is not governed by standard communications protocol such as the Global System for Mobile Communications standard, Code Division Multiple Access standard, WiFi®, Bluetooth®, etc.).

The tester may transmit initialization radio-frequency (RF) signals in a selected channel. These initialization signals may be part of a repeating signals pattern and may have some common properties with the test signals. The DUTs may receive the initialization signals and synchronize with the tester (e.g., the DUTs are now ready to receive and decode test signals transmitted from the tester).

The tester may then sequentially broadcast RF test signals (e.g., test packets) encoded using different radio-frequency modulation schemes. While the tester is broadcasting the test packets, the tester may ramp down its output power level in a step-wise fashion. The DUTs may each include a counter circuit that monitors the number of received test packets for each of the different modulation schemes as the output power is stepped down. The DUTs may be capable of computing a desired radio-frequency performance metric (e.g., packet error rate, bit error rate, frame error rate, symbol error rate, etc.) based on the output values of the counter circuits.

For any given DUT, if at any point the measured performance metric fails to satisfy design criteria (e.g., the measured packet error rate exceeds a maximum acceptable threshold level), that DUT may record the power level at its receiver (i.e., received signal strength indication (RSSI)) as its downlink sensitivity level for that particular modulation scheme.

Testing may continue using this approach until each DUT has calculated its downlink sensitivity for each modulation scheme at desired channels. The DUTs may individually signal to a test operator to indicate completion of the test (e.g. displaying a status indication on a graphical user interface, producing an audible tone or sound, etc.). Completed DUTs may then be removed from the test chamber. The calculated downlink sensitivity may be loaded onto the test host or may be stored on the DUT for later retrieval or analysis.

Further features of the present invention, its nature and various advantages will be more apparent from the accompanying drawings and the following detailed description.

DETAILED DESCRIPTION

Wireless electronic devices include antenna and transceiver circuitry that support wireless communications. Examples of wireless electronic devices include desktop computers, computer monitors, computer monitors containing embedded computers, wireless computer cards, wireless adapters, televisions, set-top boxes, gaming consoles, routers, or other electronic equipment. Examples of portable wireless electronic devices include laptop computers, tablet computers, handheld computers, cellular telephones, media players, and small devices such as wrist-watch devices, pendant devices, headphone and earpiece devices, and other miniature devices.

Devices such as these are often provided with wireless communications capabilities. For example, electronic devices may use long-range wireless communications circuitry such as cellular telephone circuitry to communicate using cellular telephone bands at 850 MHz, 900 MHz, 1800 MHz, and 1900 MHz (e.g., the main Global System for Mobile Communications or GSM cellular telephone bands). Long-range wireless communications circuitry may also handle the 2100 MHz band.

Electronic devices may use short-range wireless communications circuitry such as wireless local area network (WLAN) circuitry to handle communications with nearby equipment. For example, electronic devices may communicate using the WiFi® (IEEE 802.11) bands at 2.4 GHz and 5 GHz and the Bluetooth® band at 2.4 GHz. It is sometimes desirable to receive satellite navigation system signals such as signals from the Global Positioning System (GPS). Electronic devices may therefore be provided with circuitry for receiving satellite navigation signals such as GPS signals at 1575 MHz.

Figure 1:
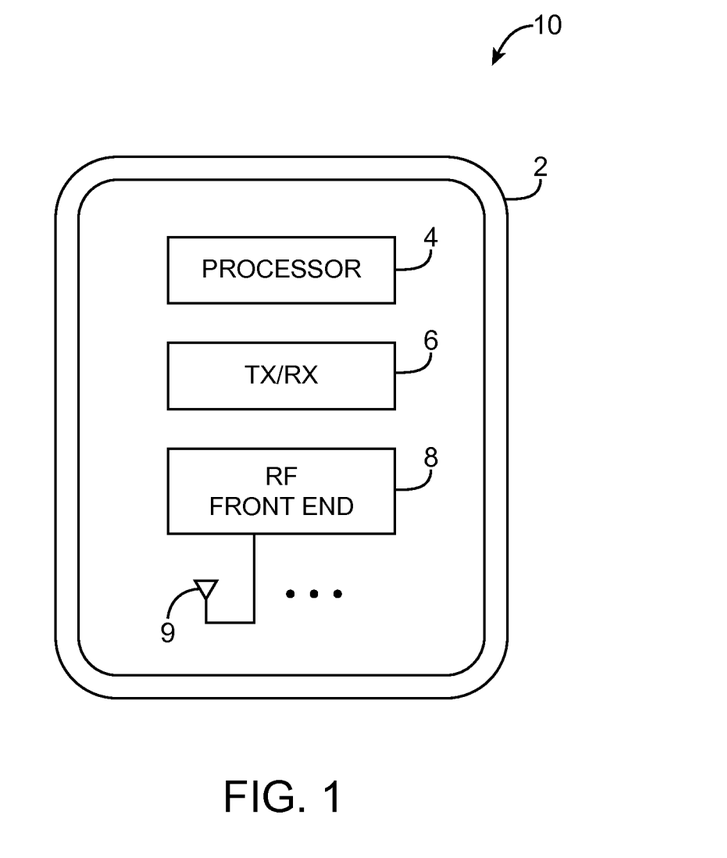
FIG. 1 is a diagram of an illustrative wireless device under test with radio-frequency circuitry in accordance with an embodiment of the present invention.

In testing environments, the wireless electronic devices are sometimes referred to as devices under test (DUTs). FIG. 1 shows an example of a test device such as DUT 10. DUT 10 may be a portable electronic device, a cellular telephone, a computer, a multimedia device, or other electronic equipment. DUT 10 may have a device housing such as housing 2 that forms a case for its associated components.

DUT 10 may have storage and processing circuitry such as storage and processing circuitry 4. Storage and processing circuitry 4 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 4 may be used to control the operation of device 10. This processing circuitry may be based on one or more microprocessors, microcontrollers, digital signal processors, application specific integrated circuits, etc.

Circuitry 4 may interact with a transceiver circuit such as transceiver circuit 6. Transceiver circuit 6 may include an analog-to-digital converter (ADC), a digital-to-analog converter (DAC), a digital down-converter (DDC), and a digital up-converter (DUC).

In a scenario in which DUT 10 is transmitting, circuitry 4 may provide digital data (e.g., baseband signals) to the DUC. The DUC may convert or modulate the baseband digital signals to an intermediate frequency (IF). The IF digital signals may be fed to the DAC to convert the IF digital signals to IF analog signals. The IF analog signals may then be fed to an RF front end such as RF front end 8.

When DUT 10 is receiving wireless signals, RF front end 8 may provide incoming IF analog signals to the ADC. The ADC may convert the incoming IF analog signals to incoming IF digital signals. The incoming IF digital signals may then be fed to the DDC. The DDC may convert the incoming IF digital signals to incoming baseband digital signals. The incoming baseband digital signals may then be provided to circuitry 4 for further processing. Transceiver circuit 6 may either up-convert baseband signals to IF signals or down-convert IF signals to baseband signals. Transceiver block 6 may therefore sometimes be referred to as an IF stage.

RF front end 8 may include circuitry that couples transceiver block 6 to one or more antenna such as antenna 9. RF front end 8 may include circuitry such as matching circuits, band-pass filters, mixers, low noise amplifier circuitry, power amplifier circuitry, etc. Circuitry 4, transceiver block 6, RF front end 8, and antenna 9 may be housed within housing 2.

In the scenario in which DUT 10 is transmitting, RF front end 8 may up-convert the IF analog signals from transceiver block 6 to RF analog signals (e.g., the RF signals typically have higher frequencies than the IF signals). The RF analog signals may be fed to antenna 9 for broadcast. If desired, more than one antenna may be used in DUT 10.

In the scenario in which DUT 10 is receiving wireless signals, antenna 9 may receive incoming RF analog signals from a broadcasting device such as a base transceiver station, network access point, etc. The incoming RF analog signals may be fed to RF front end 8. RF front end 8 may down-convert the incoming RF analog signals to IF analog signals. The IF analog signals may then be fed to transceiver circuit 6 for further data processing.

Examples of cellular telephone standards that may be supported by the wireless circuitry of device 10 include: the Global System for Mobile Communications (GSM) "2G" cellular telephone standard, the Evolution-Data Optimized (EVDO) cellular telephone standard, the "3G" Universal Mobile Telecommunications System (UMTS) cellular telephone standard, the "3G" Code Division Multiple Access 2000 (CDMA 2000) cellular telephone standard, and the "4G" Long Term Evolution (LTE) cellular telephone standard. Other cellular telephone standards may be used if desired. These cellular telephone standards are merely illustrative.

It may be desirable to obtain downlink sensitivity values for DUT 10 across different modulation schemes (e.g., to measure the downlink sensitivity of the WLAN circuitry at different data rates). Downlink sensitivity may be defined as the maximum output power level of radio-frequency signals transmitted using another wireless device (e.g., a signal generator, a network access point, etc.) for which the radio-frequency signals received by DUT 10 fails to satisfy performance criteria. The performance criteria may specify an acceptable performance threshold level for the quality of the received radio-frequency signals.

The performance criteria may, for example, specify a maximum acceptable packet error rate. Packet error rate may be calculated by dividing the number of missed packets by the total number of packets transmitted in a given time interval. If only 95 out of 100 transmitted packets are received by DUT 10, the corresponding packet error rate (PER) will be equal to 5% (as an example).

Consider a scenario in which the performance criteria specify a packet error rate of 10%. A tester may be directed to transmit radio-frequency test packets using a desired modulation scheme (e.g., at a data rate associated with the desired modulation scheme). The tester may transmit the test packets at an output power level of −109 dBm during a first time period and may transmit the test packets at an output power level of −110 dBm during a second time period.

DUT 10 receiving the test packets transmitted at −109 dBm may compute a corresponding PER of 9.8%, whereas DUT 10 receiving the test packets transmitted at −110 dBm may calculate a corresponding PER of 10.1%. The downlink sensitivity of the WLAN circuitry of DUT 10 may therefore be approximately equal to −110 dBm, because output power levels greater than −110 dBm output power level yields PERs that are less than the maximum acceptable threshold level of 10% (as an example).

The WLAN circuitry of DUT 10 may exhibit different downlink sensitivity levels depending on the modulation scheme or data rate of the radio-frequency signals being received at DUT 10. For example, a tester may transmit test signals encoded using the 16-QAM (Quadrature Amplitude Modulation) scheme at 24 Mbps and at 36 Mbps. The corresponding measured downlink sensitivity may be different for signals transmitted at 24 Mbps versus signals transmitted at 36 Mbps.

As another example, the tester may transmit test signals encoded using the Quadrature Phase-Shift Keying (QPSK) scheme at 12 Mbps and may transmit test signals encoded using the 64-QAM scheme at 54 Mbps. The corresponding measured downlink sensitivity may be different for the signals transmitted using QPSK at 12 Mbps versus the signals transmitted using 64-QAM at 54 Mbps. It may therefore be desirable to characterize the downlink sensitivity of DUT 10 at desired modulation schemes and data rates.

Downlink sensitivity may be calculated based on a user-specified threshold level that varies depending on the current communications protocol under test. For example, the threshold level may be set to 8% when testing modulations schemes associated with IEEE 802.11b, whereas the threshold level may be set to 10% when testing modulation schemes associated with IEEE 802.11g (as examples).

Figure 2:
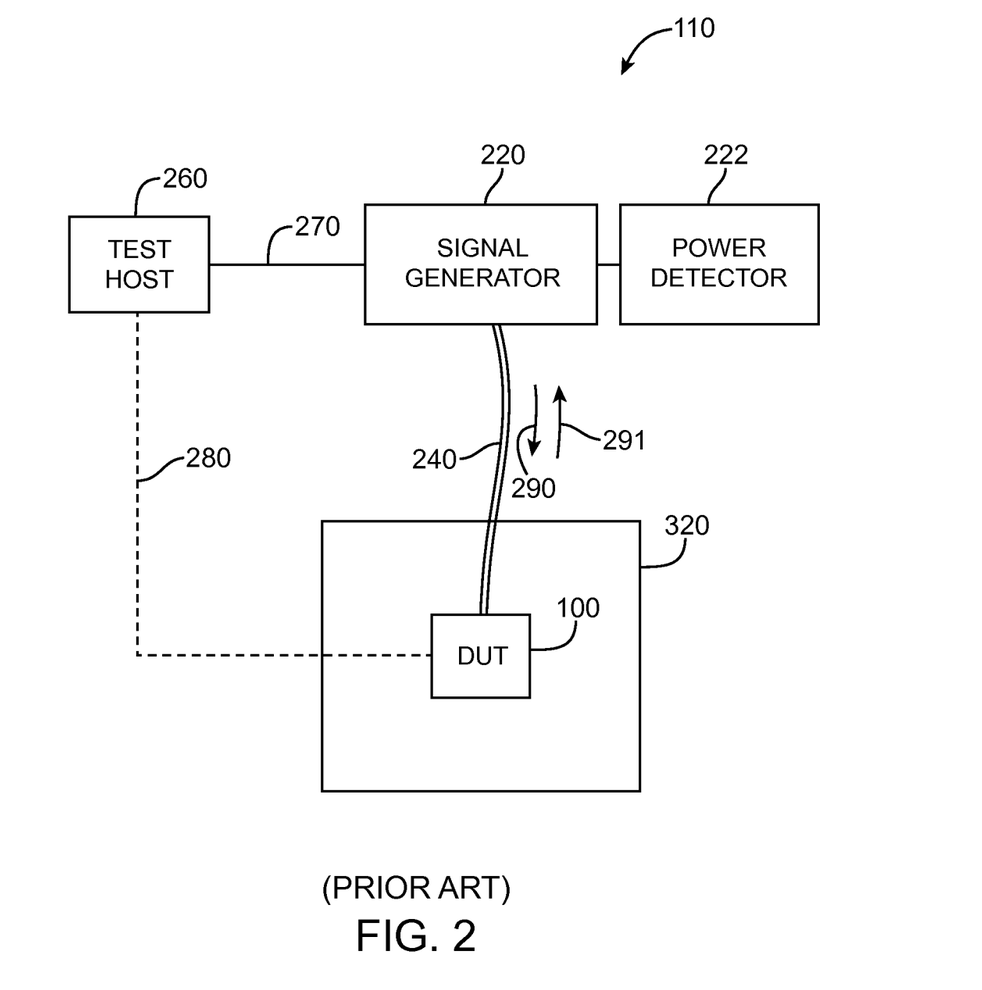
FIG. 2 is a diagram of a conventional test station that includes a test host, a signal generator, a power detector, and a test chamber.

FIG. 2 is a diagram of conventional test system 110 that can be used to measure downlink sensitivity of DUT 100. As shown in FIG. 2, conventional test system 110 includes test host 260, signal generator 220, power detector 222, and test chamber 320. Signal generator 220 is connected to test host 260 through line 270. Signal generator 220 may rely on power detector 222 to perform downlink sensitivity measurements for different modulation schemes by analyzing acknowledgement signals received from DUT 100.

During downlink sensitivity testing, DUT 100 is placed within test chamber 320. DUT 100 is connected to signal generator 220 through radio-frequency cable 240 and is connected to test host 260 through cable 280. Test host 260 directs signal generator 220 to transmit radio-frequency signals to DUT 100 in the direction of arrow 290 through cable 240 (see, FIG. 2). Radio-frequency signals are conveyed between DUT 100 and signal generator 220 over a protocol-compliant authenticated data link (i.e., an active session has been established between signal generator 220 and the WLAN circuitry of DUT 100).

Testing one DUT at a time using the test setup of FIG. 2 may be time-consuming because the devices under test are tested sequentially one at a time and because protocol-based testing requires all signaling and measurement sequences to adhere to strict protocol guidelines. Moreover, performing downlink sensitivity testing using power detector 222 may be costly.

Figure 3:
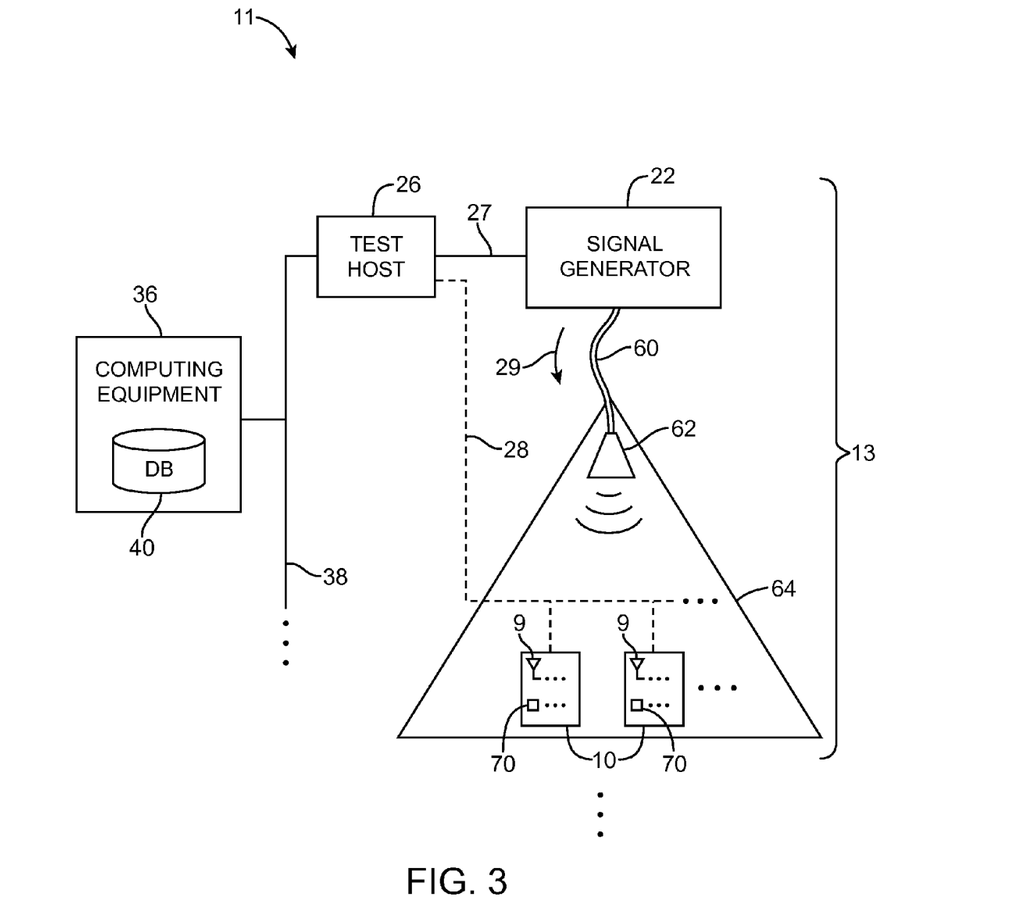
FIG. 3 is a diagram of illustrative test stations each connected to computing equipment and each including a test host, a tester, a test chamber, and an antenna in the test chamber in accordance with an embodiment of the present invention.

During testing, many wireless devices (e.g., tens, hundreds, thousands, or more of DUTs 10) may be tested in a test system such as test system 11 of FIG. 3. Test system 11 may include test accessories, computers, network equipment, tester control boxes, cabling, test chambers, test antennas within the test chambers, and other test equipment for transmitting and receiving radio-frequency test signals and gathering test results. Test system 11 may include multiple test stations such as test stations 13. There may, for example, be eighty test stations 13 at a given test site. Test system 11 may include any desired number of test stations to achieve desired test throughput.

Each test station 13 may include a test host such as test host 26, a tester such as signal generator 22, and a test chamber such as test chamber 64. Test host 26 may, for example, be a personal computer or other types of computing equipment. The power detector of FIG. 2 need not be used in test system 11.

Signal generator 22 may be a radio communications tester of the type that is sometimes referred to as a call box or a base station emulator. Signal generator 22 may, for example, be the CMU200 Universal Radio Communication Tester available from Rohde & Schwarz. Signal generator 22 may be used to emulate the behavior of a network access point to test the ability of transceiver 6 to support the WiFi® communications protocol, the Bluetooth® communications protocol, or other communications standards. If desired, signal generator 22 may be configured to emulate the behavior of a base transceiver station during a telephone call with the cellular telephone transceiver circuitry of DUT 10 (as an example).

Signal generator 22 may be operated directly or via computer control (e.g., when signal generator 22 receives commands from test host 26). When operated directly, a user may control signal generator 22 by supplying commands directly to the signal generator using the user input interface of signal generator 22. For example, a user may press buttons in a control panel on the signal generator while viewing information that is displayed on a display in generator 22. In computer controlled configurations, a test host such as computer 26 (e.g., software running autonomously or semi-autonomously on the computer) may communicate with signal generator 22 (e.g., by sending and receiving data over a wired path 27 or a wireless path between the computer and the signal generator).

During wireless testing, more than one DUT 10 may be placed within test chamber 64 (e.g., DUTs 10 may be tested in parallel). DUTs 10 may each be coupled to test host 26 through line 28. The connection represented by line 28 may be a Universal Serial Bus (USB) based connection, a Universal Asynchronous Receiver/Transmitter (UART) based connection, or other suitable types of connection. If desired, DUTs 10 need not be electrically connected to test host 26.

Test chamber 64 may have a cubic structure (six planar walls), a rectangular prism-like structure (six rectangular walls), or other suitable structures. Test chamber 64 may, for example, be a pyramidal-shaped transverse electromagnetic (TEM) cell (see, e.g., FIG. 3). TEM cell 64 may be used to perform electromagnetic compatibility (EMC) radiated tests without experiencing interference from ambient electromagnetic environment.

Test station 13 may be configured to perform over-the-air (OTA) testing (sometimes referred to as radiated testing). In the test setup of FIG. 3, signal generator 22 may be connected to a test antenna such as antenna 62 through RF cable 60. Antenna 62 may be a microstrip antenna such as a microstrip patch antenna, a horn antenna, or other types of antennas. Antenna 62 may be placed within test chamber 64.

During downlink signal transmission, signal generator 22 may generate radio-frequency test signals in the direction of arrow 29. Antenna 62 may wirelessly transmit the test signals to DUTs 10 in TEM cell 64 over a non-protocol-compliant communications path (e.g., an authenticated wireless communications data link need not be established). Antennas 9 in DUTs 10 may receive the radiated test signals.

DUTs 10 may be loaded with a test operating system (e.g., a simplified operating system that lacks a full Internet Protocol (IP) stack implementation) or a normal user operating system (e.g., an operating system that includes a full Internet Protocol (IP) stack implementation). DUTs 10 may each include wireless performance measurement circuitry capable of analyzing the received test signals. As shown in FIG. 3, each DUT 10 may include at least one counter such as counter 70. Counter 70 may be used to monitor the number of received packets (for packet error rate calculation), the number of received packets of each data rate or modulation, the number of received frames (for frame error rate calculation), the number of received bits (for bit error rate calculation), etc.

Counter 70 may therefore be used to monitor desired radio-frequency performance metrics during downlink sensitivity testing while tester 22 ramps down its output power level. Each DUT 10 may have a single counter 70 that is used to monitor the desired RF performance metric(s) for each modulation scheme and data rate to be tested (e.g., counter 70 may be reset before testing a successive modulation scheme and data rate). In another suitable arrangement, each DUT 10 may include multiple counters 70, each of which is used to monitor the desired RF performance metric(s) for a respective modulation scheme and data rate (e.g., counter 70 may be reset prior to changing the output power level of tester 22).

As shown in FIG. 3, each test station 13 may be connected to computing equipment 36 through line 38. Computing equipment 36 may include storage equipment on which a database 40 is stored. After downlink sensitivity testing has been completed at desired frequencies, DUTs 10 may be removed from test chamber 64. Test data (e.g., calculated downlink sensitivity values of each DUT 10 for the different modulation schemes) may then be loaded onto associated test host 26. The downlink sensitivity information gathered at the different test stations 13 may be stored in database 40.

Figure 4:
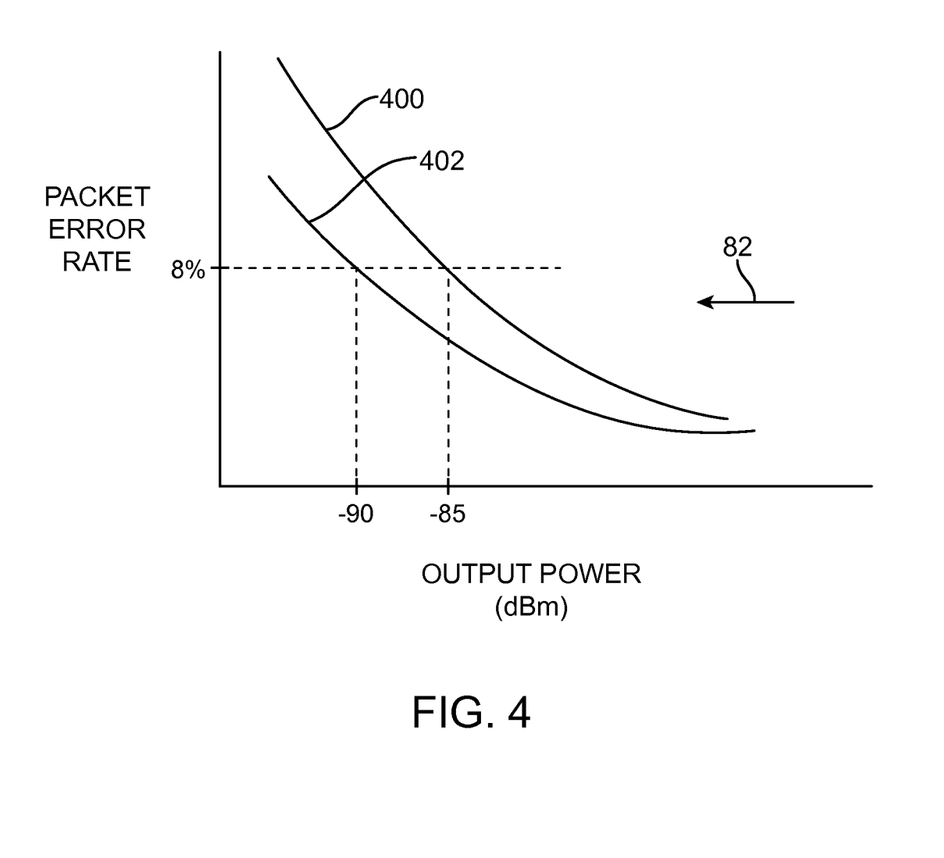
FIG. 4 is a plot illustrating how packet error rate may vary as a function of output power in accordance with an embodiment of the present invention.

FIG. 4 is a plot showing how a communications performance metric such as packet error rate (PER) may vary as a function of output power level. Characteristic curve 400 may represent a PER profile associated with a first modulation scheme, whereas characteristic curve 402 may represent a PER profile associated with a second modulation scheme. As shown in FIG. 4, a lower output power level generally corresponds to a higher error rate.

Downlink sensitivity may be determined by ramping down the output power level (in the direction of arrow 82) and monitoring the corresponding packet error rate. For example, consider a scenario in which the maximum acceptable packet error rate specified by design criteria is 8%. The downlink sensitivity associated with the first and second modulation schemes may be equal to the output power levels corresponding to an 8% PER. In this example, the downlink sensitivity for the first modulation scheme is shown to be equal to −85 dBm, whereas the downlink sensitivity for the second modulation scheme is shown to be equal to −90 dBm.

As another example, it may be desirable to find the highest power which results in a particular radio-frequency performance metric, regardless of the performance metric at lower powers. As another example, it may be desirable to characterize one or more radio-frequency performance metrics across a wide range of output power levels without regard to one or more predefined performance metric limits.

FIG. 4 is merely illustrative. If desired, other radio-frequency performance metrics (e.g., frame error rate, bit error rate, symbol error rate, receive power level, dynamic range, frequency response, adjacent channel leakage ratio, error vector magnitude, power spectral density, etc.) may be monitored while decreasing the output power level to determine the downlink sensitivity of DUT 10.

Figure 5A:
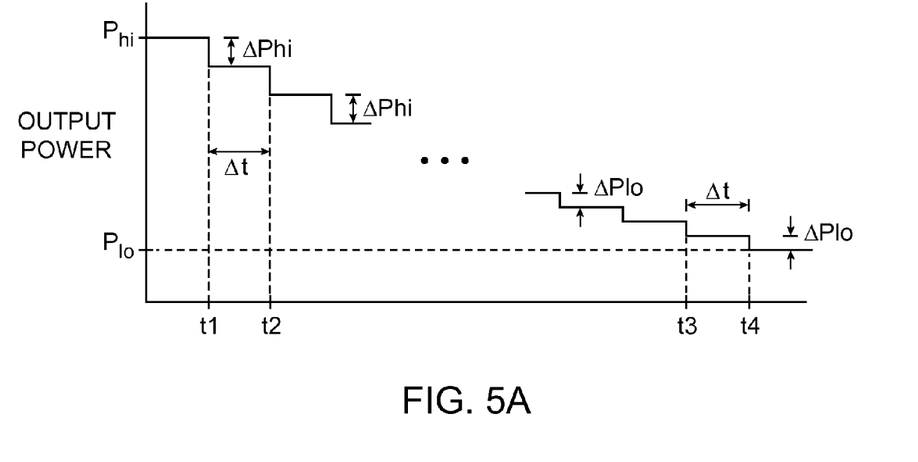
FIG. 5A is a timing diagram illustrating how tester output power may vary in time during downlink sensitivity testing in accordance with an embodiment of the present invention.

FIG. 5A is a timing diagram showing how the output power level may be ramped down in a predictable step-wise fashion. As shown in FIG. 5A, the output power level may be stepped down from a high output power level Phi (e.g., a maximum output power level required for downlink sensitivity testing) to a low output power level Plo (e.g., a minimum output power level required for downlink sensitivity testing). If desired, the tester output power level may be adjusted using patterns other than the monotonically decreasing pattern (e.g. alternating up-down step-wise patterns, step-wise increasing, linearly increasing, linearly decreasing, etc.).

The test duration ⊗t for each output power level may be equal. When the output power is high (e.g., when the output power level is within 20 dB of Phi), a base receive signal strength indicator (RSSI) may be measured. The base RSSI may be used to characterize the receive capability of each DUT 10. For example, if Phi is equal to −65 dBm and the corresponding base RSSI is equal to −70 dBm, the DUT may have an offset of 5 dB. This offset may be different for each DUT 10 and may be accounted for during downlink sensitivity calculation.

The change in output power may be larger at higher output power levels (see, e.g., ⊗ Phi from time t1 to t2), whereas the change in output power may be smaller at lower output power levels (see, e.g., ⊗ Plo from time t3 to t4). When it is desirable to determine the DUT's minimum sensitivity level, this arrangement speeds up testing during higher power levels where receive capability is substantially robust and provides finer resolution during lower power levels for accurate downlink sensitivity calculation.

Each DUT 10 is able to calculate its downlink sensitivity before Plo is reached. When Plo is reached, the output power level is set to Phi to begin testing a successive band/channel.

Figure 5B:
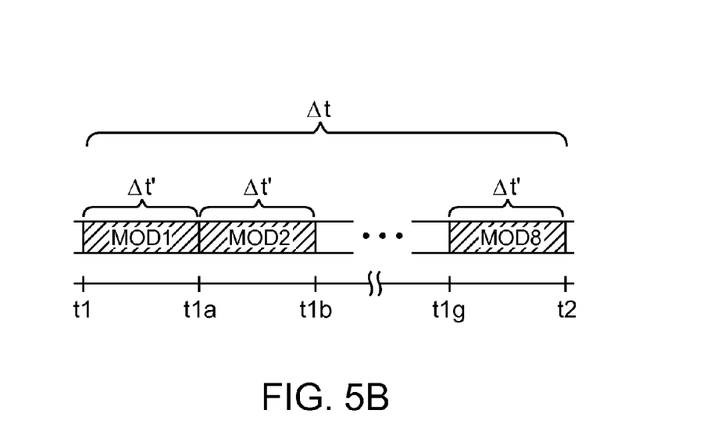
FIG. 5B is a timing diagram illustrating sequential transmission of test packets having different modulation schemes in accordance with an embodiment of the present invention.

FIG. 5B illustrates one suitable arrangement of radio-frequency test signals transmitted at each output power level. As shown in FIG. 5B, each period ⊗ t may be divided into multiple time segments ⊗ t'. During each time segment ⊗ t', radio-frequency signals encoded using a respective modulation scheme may be transmitted by tester 22.

For example, a first number of test packets may be transmitted using first modulation scheme MOD1 during the first time segment (from time t1 to t1a), a second number of test packets may be transmitted using second modulation scheme MOD2 during the second time segment (from time t1a to t1b), etc. This sequence of test signals transmitted using selected modulation schemes in a predetermined ordered list of modulation schemes to be tested may be consistent at each output power level. The number of test packets transmitted during each segment ⊗ t' may be tracked using counter 70. If only one packet counter 70 is used, counter 70 may be reset between successive time segments. If multiple counters 70 are used (each of which is used to track the number of received packets for a respective modulation scheme), counters 70 can be reset at the end of each time interval ⊗ t (e.g., counters 70 need only be reset immediately prior to changing the output power level).

The arrangement of FIG. 5B is merely illustrative. The example of FIG. 5B shows eight types of modulation schemes (or data rates) being tested at each output power level. If desired, any number of modulation schemes (e.g., at least two, at least eight, etc.) may be tested at each output power level.

Figure 6:
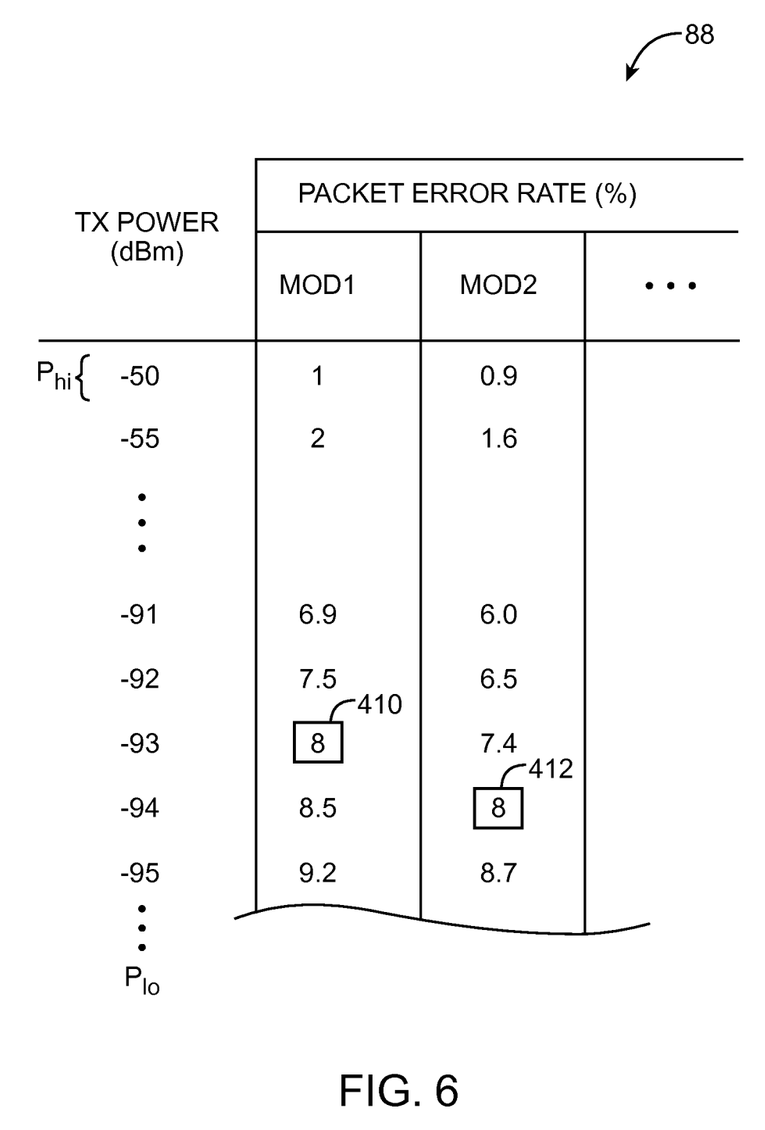
FIG. 6 is a table illustrating how packet error rate may vary as a function of output power and modulation scheme in accordance with an embodiment of the present invention.

FIG. 6 shows an illustrative table of radio-frequency performance data that may be recorded by DUT 10 during simultaneous downlink sensitivity testing. As shown in FIG. 6, table 88 includes measured packet error rates for decreasing output power levels for each modulation scheme in a predetermined pattern of modulation schemes to be tested. This is merely illustrative. If desired, DUT 10 may compute packet error rates or other radio-frequency performance metrics for test signals transmitted at different data rates, for test signals associated with different communications standards, etc.

At a Phi of −50 dBm, the base RSSI associated with test packets transmitted using a first modulation scheme MOD1 may be equal to −55 dBm, whereas the base RSSI associated with test packets transmitted using a second modulation scheme MOD2 may be equal to −53 dBm. An offset of 5 dB (−50 minus −55) may therefore exist for MOD1, whereas an offset of 3 dB (−50 minus −53) may exist for MOD2 (as examples).

The measured packet rates (PER) increases (worsens) as transmit (TX) output power is stepped down in the way as described in connection with FIG. 5A. In this example, the predetermined threshold (i.e., the maximum acceptable packet error rate) may be set to 8%. DUT 10 may be capable of detecting when the measured packet error rate (e.g., the packet error rate measured using counter 70) exceeds the specified threshold. For example, DUT 10 can determine that a tester output level of −93 dBm yields an 8% PER for test signals associated with MOD1, whereas a tester output level of −94 dBm yield an 8% PER for test signals associated with MOD2.

Taking into account the offset of DUT 10, the downlink sensitivity of DUT 10 may therefore be equal to −98 dBm (−93 minus the offset of 5 dB) for MOD1 and equal to −97 dBm (−94 minus the offset of 3 dB) for MOD2. When DUT 10 obtains its calculated downlink sensitivity, it can record that value internally or may send that value directly to the test host. If desired, the maximum acceptable packet error rate may be less than 8% or greater than 8% for each modulation scheme, data rate, or protocol (e.g., the predetermined threshold value may be user-specified). It may alternatively be desirable to characterize the PER performance at all power levels. In this case, DUT 10 may record PER at all levels until Plo or until DUT 10 can no longer receive any power.

Figure 7:
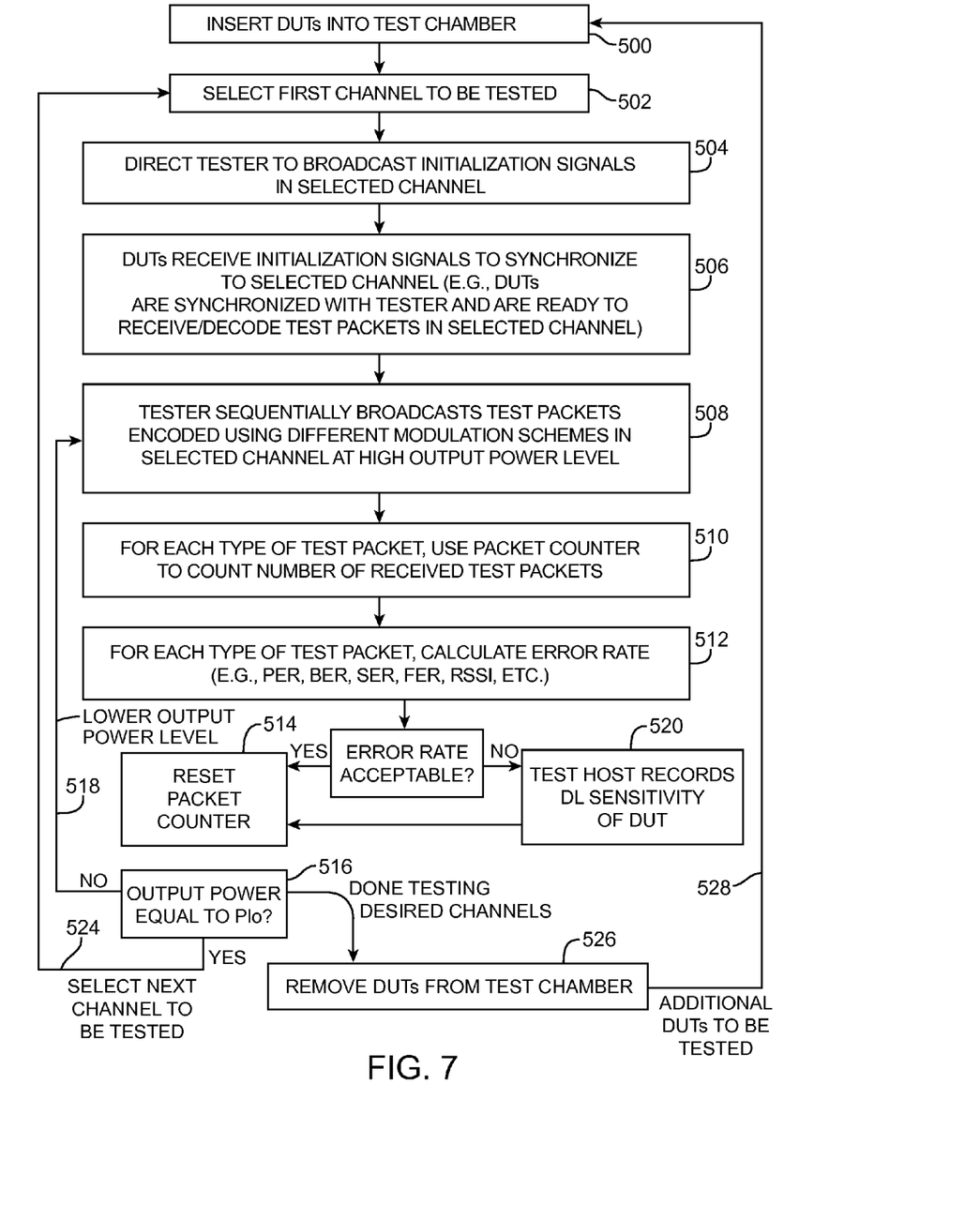
FIG. 7 is a flow chart of illustrative steps involved in performing simultaneous downlink sensitivity testing for multiple devices under test placed within a test chamber in accordance with an embodiment of the present invention.

FIG. 7 is a flow chart of illustrative steps that can be used to obtain downlink sensitivity values for multiple DUTs 10 using the test setup of FIG. 3. At step 500, multiple DUTs 10 may be placed in test chamber 64. At step 502, a channel may be selected for testing.

At step 504, test host 26 may direct tester 22 to broadcast initialization signals in the selected channel. When DUTs 10 receive the initialization signals, DUTs 10 is said to have synchronized with the tester 22 and are ready to receive radio-frequency signals in the selected channel (step 506).

At step 508, test host 26 may direct tester 22 to sequentially broadcast radio-frequency test packets encoded using multiple modulation schemes in the selected channel at high output power Phi (e.g., tester 22 may transmit test packets having multiple modulation schemes using the timing arrangement of the type described in connection with FIG. 5B).

At step 510, counter(s) 70 may be used to count the number of received test packets for each modulation scheme. At step 512, DUT 10 may calculate a corresponding performance metric value (e.g., packet error rate, frame error rate, bit error rate, symbol error rate, receive signal strength indicator, power spectrum density, frequency response, signal-to-noise ratio, etc.) based on data gathered using counter(s) 70.

If the calculated error rate is acceptable, counter 70 may be reset to a count of zero (step 514). If the current output power is not equal to Plo, processing may loop back to step 508, and the output power may be lowered in the way as described in connection with FIG. 5A (see, e.g., path 518, tester 22 will now generate test packets at a lower output power).

If the calculated error rate fails design criteria for a given DUT, the given DUT may compute and store the downlink sensitivity RSSI value associated with the current modulation scheme (optionally taking into account base RSSI). Counter 70 may then be reset to a count of zero (step 514). If the current output power is not equal to Plo, processing may loop back to step 508, and the output power may be lowered in the way as described in connection with FIG. 5A (as indicated by path 518).

At step 516, if the current output power is equal to Plo and there are additional channels to be tested, processing may loop back to step 502 (as indicated by path 524). If the current output power is equal to Plo and all desired channels have been tested, DUTs 10 may be removed from test chamber 64 (step 526). Processing may loop back to step 500 if there are additional DUTs to be tested, as indicated by path 528. Downlink sensitivity testing need not be performed on a batch-bybatch basis. If desired, multiple DUTs may be simultaneously placed in the test chamber for parallel testing while a single DUT 10 may be inserted or removed from test chamber 64 at any time by a test operator.

The steps of FIG. 7 are merely illustrative. If desired, the steps of FIG. 7 may be used during device characterization, product design testing, production testing, or other test phases.

The foregoing is merely illustrative of the principles of this invention and various modifications can be made by those skilled in the art without departing from the scope and spirit of the invention.

What is claimed is:

1. A method of performing downlink sensitivity testing on a plurality of devices under test with a test station, wherein the test station includes a tester and a test chamber in which the plurality of devices under test are tested, and wherein each of the plurality of devices under test includes storage circuitry, the method comprising:
   directing the tester to wirelessly broadcast first test signals modulated using a first radio-frequency modulation scheme to each of the plurality of devices under test; and
   directing the tester to wirelessly broadcast second test signals modulated using a second radio-frequency modulation scheme that is different than the first radio-frequency modulation scheme to each of the plurality of devices under test.

2. The method defined in claim 1, further comprising:
   directing the tester to wirelessly broadcast initialization signals in a radio-frequency channel to each of the plurality of devices under test to synchronize each of the plurality of devices under test to the radio-frequency channel.

3. The method defined in claim 2, wherein directing the tester to wirelessly broadcast the first test signals comprises directing the tester to wirelessly broadcast the first test signals at a first output power level during a first time period and wherein directing the tester to wirelessly broadcast the second test signals comprises directing the tester to wirelessly broadcast the second test signals at the first output power level during a second time period.

4. The method defined in claim 3, further comprising:
   after using the tester to broadcast the first and second test signals at the first output power level during which each of the plurality of devices under test receives the first and second test signals and measures corresponding radio-frequency performance metrics for the first and second test signals, directing the tester to broadcast test signals to the plurality of devices under test at a second output power level that is different than the first output power level, wherein the measured radio-frequency performance metrics include metrics selected from the group consisting of: a symbol error rate, a bit error rate, a frame error rate, a packet error rate, and power spectral density.

5. The method defined in claim 4, wherein the test station further includes a test host and wherein directing the tester to wirelessly broadcast the first and second test signals comprises:
   with the test host, directing the tester to wirelessly broadcast the first and second test signals to each of the plurality of devices under test.

6. The method defined in claim 5, further comprising:
   with the test host, directing the tester to wirelessly broadcast initialization and test radio-frequency signals in an additional radio-frequency channel to each of the plurality of devices under test.

7. The method defined in claim 6, further comprising:
   removing the plurality of devices under test from the test chamber; and
   with the test host, gathering calculated downlink sensitivity data from each of the plurality of devices under test.

8. The method defined in claim 7, wherein each of the plurality of devices under test comprises wireless local area network circuitry and wherein wirelessly broadcasting the first and second test signals to the plurality of devices under test comprises:
   wirelessly broadcasting the first and second test signals to the wireless local area network circuitry in each of the plurality of devices under test.

9. The method defined in claim 1, wherein wirelessly broadcasting the first and second test signals to each of the plurality of devices under test comprises:
   wirelessly broadcasting the first and second test signals to each of the plurality of devices under test over a non-protocol-compliant communications path.

10. A method of testing a plurality of devices under test with a test station, the method comprising:
    with the test station, performing downlink testing by sequentially broadcasting radio-frequency signals modulated using respective modulation schemes in accordance with an ordered list of predetermined modulation schemes to be tested, wherein the respective modulation schemes exhibit different data rates.

11. The method defined in claim 10, wherein the test station comprises a tester, a test host, and a test chamber and wherein performing downlink testing comprises:
    with the test host, directing the tester to sequentially broadcast the radio-frequency signals modulated using the respective modulation schemes in accordance with the ordered list of predetermined modulation schemes to be tested, wherein each of the plurality of devices under test is placed in the test chamber and wherein the radio-frequency signals are wirelessly transmitted to each of the plurality of devices under test over a non-protocol-compliant path.

12. The method defined in claim 11, wherein performing downlink testing further comprises:
    with each of the plurality of devices under test, receiving the radio-frequency signals broadcast from the tester; and
    with each of the plurality of devices under test, measuring a corresponding radio-frequency performance metric for the received radio-frequency signals.

13. The method defined in claim 12, wherein measuring the corresponding radio-frequency performance metric comprises:
    measuring a metric selected from the group consisting of: a symbol error rate, a bit error rate, a frame error rate, a packet error rate, power spectral density, and a receive signal strength indicator.

14. The method defined in claim 13, wherein directing the tester to sequentially broadcast the radio-frequency signals comprises:
    directing the tester to broadcast the radio-frequency signals at a given output power level for each of the modulation schemes in the ordered list of predetermined modulation schemes to be test.

15. The method defined in claim 14, wherein directing the tester to sequentially broadcast the radio-frequency signals further comprises:
    directing the tester to sequentially broadcast radio-frequency signals modulated using the respective modulation schemes in accordance with the ordered list of modulation schemes to be tested at an additional output power level that is different than the given output power level.

16. The method defined in claim 15, further comprising:
with each of the plurality of devices under test, computing a downlink sensitivity value for each of the modulation schemes in the ordered list of predetermined modulation schemes to be tested when the measured radio-frequency metric fails to satisfy a user-specified threshold.

17. The method defined in claim 16, wherein each of the plurality of devices under test comprises wireless local area network circuitry and wherein computing the downlink sensitivity value comprises:
with each of the plurality of devices under test, computing the downlink sensitivity value for the wireless local area network circuitry of that device under test for each of the modulation schemes in the ordered list of predetermined modulation schemes to be tested.

18. A method of performing downlink sensitivity testing on a plurality of devices under test with a test station, wherein the test station includes a tester and a test chamber in which the plurality of devices under test are tested and wherein each of the plurality of devices under test includes counter circuitry, the method comprising:
directing the tester to wirelessly broadcast test signals to each of the plurality of devices under test; and
with each of the plurality of devices under test, receiving the test signals and monitoring the quality of the received test signals using the counter circuitry of that device under test.

19. The method defined in claim 18, further comprising:
while receiving the test signals with each of the plurality of devices under test, using the counter circuitry in each of the plurality of devices under test to compute radio-frequency performance metrics, wherein the radio-frequency performance metrics include metrics selected from the group consisting of: a symbol error rate, a bit error rate, a frame error rate, a packet error rate, and power spectral density.

20. The method defined in claim 18, wherein directing the tester to wirelessly broadcast test signals to each of the plurality of devices under test comprises:
during a first time period, directing the tester to broadcast radio-frequency signals modulated using a first radio-frequency modulation scheme; and
during a second time period, directing the tester to broadcast radio-frequency signals modulated using a second radio-frequency modulation scheme that is different than the first radio-frequency modulation scheme; and
after the first time period and before the second time period, resetting the counter circuitry in each of the plurality of devices under test.

21. The method defined in claim 18, wherein directing the tester to wirelessly broadcast test signals to each of the plurality of devices under test comprises:
directing the tester to sequentially broadcast radio-frequency signals modulated using respective modulation schemes in accordance with an ordered list of predetermined modulation schemes to be tested.

22. The method defined in claim 21, wherein directing the tester to sequentially broadcast radio-frequency signals comprises:
during a first time period, directing the tester to sequentially broadcast radio-frequency signals modulated using the respective modulation schemes in the ordered list of predetermined modulation schemes to be tested at a first output power level;
during a second time period, directing the tester to sequentially broadcast radio-frequency signals modulated using the respective modulation schemes in the ordered list of predetermined modulation schemes to be tested at a second output power level that is different than the first output power level; and
after the first time period and before the second time period, resetting the counter circuitry in each of the plurality of devices under test.

* * * * *